Sept. 27, 1938.  F. H. LE JEUNE  2,131,186
METHOD OF FORMING BRAKE DRUMS
Filed Sept. 9, 1935
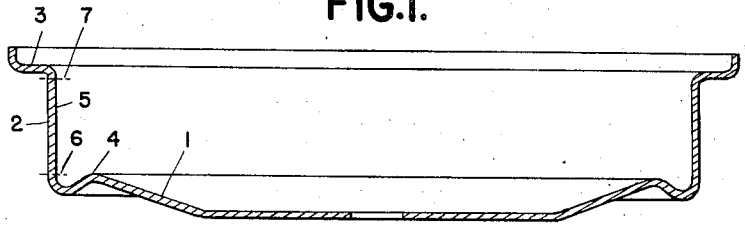
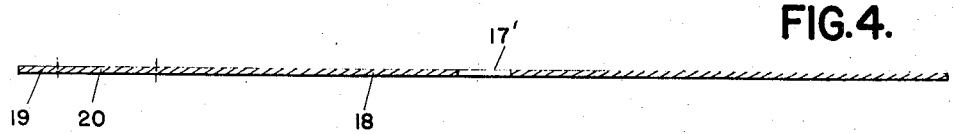
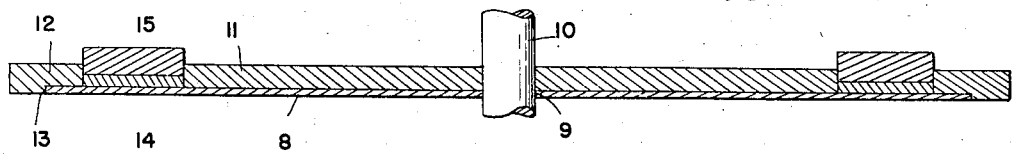
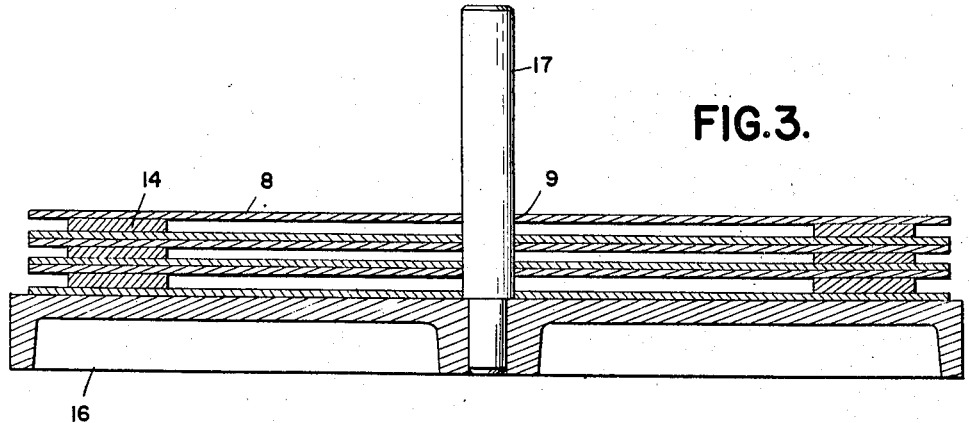
INVENTOR
FRANK H. LEJEUNE
BY
ATTORNEYS Patented Sept. 27, 1938

2,131,186

UNITED STATES PATENT OFFICE 2,131,186

METHOD OF FORMING BRAKE DRUMS

Frank H. Le Jeune, Detroit, Mich., assignor to Kelsey-Hayes Wheel Company, Detroit, Mich., a corporation of Delaware Application September 9, 1935, Serial No. 39,830

7 Claims. (Cl. 29—152.2)

The invention relates to the manufacture of brake drums and refers more particularly to the manufacture of brake drums having carburized brake surfaces.

One of the objects of the invention is to provide an improved method of forming brake drums in which the fashioning of the blanks into brake drums is accomplished after the carburizing. Another object is to provide an improved method of carburizing a brake drum blank, whereby only that portion of the brake drum blank to be used as the brake surface is to be carburized.

These and other objects of the invention will become apparent from the following description, taken in connection with the accompanying drawing, in which Figure 1 is a section through a brake drum showing an embodiment of my invention;

Figures 2 and 3 are sectional views illustrating different steps in the carburizing of the brake drum;

Figure 4 is a section illustrating the carburized blank prior to being formed into the brake drum.

The brake drum, as illustrated in Figure 1, is preferably formed of sheet metal, such as sheet steel, having a low carbon content and comprises the back 1, the annular brake flange 2 at the periphery of the back and the reinforcing rib 3 extending radially outwardly from the free edge of the brake flange. The back, in the present instance, is formed near its periphery with the annular rib 4 and the brake flange has the internal brake surface 5 having an axial extent defined by the lines 6 and 7. This brake surface is carburized and the remaining portions of the brake drum are not carburized.

In the manufacture of the brake drum, I start with the circular sheet steel blank 8 of low carbon content, this blank having the central opening 9. The pilot 10 is placed in the central opening and the inner and outer molds 11 and 12 are placed upon the blank. The inner mold has a central opening for sleeving over the pilot 10 whereby this inner mold is positioned concentrically with the blank. This inner mold is circular and its external diameter is approximately equal to that of the formed back 1. However, it is slightly greater so that the bend at the junction of the back 1 and annular brake flange 2 occurs in the uncarburized portion of the brake drum. The outer mold 12 is in the nature of a ring and it is positioned concentrically upon the blank 8 by the periphery of the blank engaging the annular shoulder 13 of the mold. The internal diameter of the outer mold is approximately equal to that of the reinforcing rib 3. However, it is slightly less so that the bend at the junction of the annular brake flange and the reinforcing rib will occur in the uncarburized portion of the brake drum. After the inner and outer molds 11 and 12 respectively have been concentrically positioned upon the blank 8, the carburizing material 14 is pressed upon the blank in the space formed by the molds by the ring 15.

The molds 11 and 12, the pilot 10 and the ring 15 are then removed and the blank 8 with the carburizing material 14 in place is placed upon the support or table 16, the blank being positioned by means of the pilot 17. A second blank like the blank 8, but without any carburizing material, is then sleeved over the pilot 17 and positioned thereby, this second blank coming to rest upon the carburizing material. Then a blank like the blank 8 with the carburizing material is sleeved over the pilot 17, the bottom face of this blank and the upper face of the second blank contacting. Then a blank like the second blank is superimposed upon the assembly. The superimposing of the various blanks is continued until the desired number have been mounted upon the support, after which the support with the blanks is placed within a furnace and heated to a sufficient temperature and for a sufficient length of time to furnish the desired extent or depth of carburizing or case hardening.

The blanks are then allowed to cool, at which time each blank as shown in Figure 4, will have the central opening 17', the central and outer portions 18 and 19 of low carbon steel, these portions being substantially unaffected by the carburizing, and the intermediate portion 20 having the upper carburized surface. These blanks are formed into brake drums, preferably by cold drawing, the intermediate portions 20 being so located that they register with the portions of the annular brake flanges having the interior brake surfaces.

What I claim as my invention is:

1. The method of forming a brake drum having an integral back and annular brake flange with the latter providing a brake surface, which comprises providing a substantially flat sheet metal blank of a size to form the brake drum, covering only that portion of the blank to be used as the brake surface with carburizing material, heating the blank with the carburizing material in place and subsequently fashioning the blank into the brake drum and locating the carburized surface to form the brake surface.

2. The method of forming a brake drum having an integral back and annular brake flange with the latter providing a brake surface, which comprises providing a sheet metal blank of a size to form the brake drum, carburizing only that portion of the blank to be used as the brake surface and subsequently fashioning the blank into the brake drum and locating the carburized surface to form the brake surface.

3. The method of forming brake drums each having an integral back and annular brake flange with the latter providing a brake surface, which comprises providing like substantially flat sheet metal blanks each of a size to form the brake drum, covering only that portion of one blank to be used as the brake surface with carburizing material, placing another blank upon the carburizing material and locating the last mentioned blank whereby only its portion to be used as the brake surface will be covered by the carburizing material, heating the blanks with the carburizing material therebetween and subsequently cold fashioning the blanks into brake drums and locating the carburized portions to form the brake surfaces.

4. The method of forming a brake drum having an integral back and annular brake flange with the latter providing a brake surface, which comprises providing a sheet metal blank of a size to form the brake drum covering the central and outer portions of the blank with spaced concentric elements, pressing carburizing materials upon the blank in the space formed by the elements, removing the elements, heating the blank and subsequently fashioning the blank into the brake drum and locating the carburized surface to form the brake surface.

5. In the method of forming a brake drum having a back and an annular brake flange with a reinforcing rib at its free edge, the steps of providing a substantially flat sheet metal blank of a size to form the brake drum and having a central opening, placing a pilot in the central opening, positioning upon the blank a circular mold by the pilot, positioning upon the blank a second mold having a circular inner edge in concentric relation to the first mentioned mold by the periphery of the blank, the external diameter of the first mentioned mold being approximately equal to that of the back and the internal diameter of the second mold being approximately equal to that of the reinforcing rib, and pressing carburizing material on the blank in the space formed by the molds.

6. The method of forming brake drums each having an integral back and annular brake flange with the latter providing a brake surface, which comprises providing like substantially flat circular sheet metal blanks each of a size to form the brake drum and each having a central opening, covering only that portion of one blank to be used as the brake surface with carburizing material, using the central opening of the last mentionel blank to position the last mentioned blank upon a support, placing another blank upon the carburizing material and using the central opening of the second mentioned blank to locate the same whereby its portion to be used as a brake surface will be covered by the carburizing material, heating the blanks with the carburizing material therebetween, and subsequently fashioning the blanks into brake drums and locating the carburized surfaces to form the brake surfaces.

7. The method of forming a brake drum having an integral back and annular brake flange, which comprises providing a substantially flat sheet metal blank of a size to form the brake drum, carburizing a side of the portion of the blank which is to form the brake flange and subsequently fashioning the blank into the brake drum with the portion having the carburized side forming the brake flange and with the carburized side forming the brake surface on the brake flange.

FRANK H. LE JEUNE.